United States Patent [19]

Moore

[11] 4,313,775

[45] Feb. 2, 1982

[54] WOOD BRICK

[76] Inventor: Luther L. Moore, 1862 Helena Ave., Reno, Nev. 89512

[21] Appl. No.: 105,508

[22] Filed: Dec. 20, 1979

[51] Int. Cl.[3] ........................ B32B 21/04; B32B 31/04

[52] U.S. Cl. ........................................ 156/196; 52/385; 144/309 B; 144/317; 144/327; 156/265; 156/297; 428/50; 428/55; 428/78; 428/161; 428/191

[58] Field of Search ........................ 428/50, 55, 78, 47, 428/191, 326, 161; 144/314 A, 315 R, 327, 309, 317, 309 Q, 254, 271, 309 B, 309 F, 314 R, 313; 156/61, 63, 71, 265, 297, 196; 52/385, 390, 314, 311, 313

[56] References Cited

U.S. PATENT DOCUMENTS

| | | | |
|---|---|---|---|
| 1,886,363 | 11/1932 | Aufderheide | 52/314 |
| 2,847,721 | 8/1958 | Diamond | 52/314 |
| 2,849,759 | 9/1958 | Burdette | 52/311 |
| 3,177,279 | 4/1965 | Bilodeau | 52/314 |
| 3,515,620 | 6/1970 | McPherson | 52/314 |
| 3,535,839 | 10/1970 | Strübing | 428/50 |
| 3,788,929 | 1/1974 | Hutunen | 144/309 B |
| 3,897,581 | 7/1975 | Nakatsuka et al. | 428/44 |
| 4,079,554 | 3/1978 | Terwilliger | 428/47 |

*Primary Examiner*—Paul J. Thibodeau
*Attorney, Agent, or Firm*—Herbert C. Schulze

[57] ABSTRACT

This invention is a simulated brick decorative surface constructed from specially shaped and cut sections of wood. In its most preferred embodiment, the small wood sections cut across the grain of the wood and in its very best form at an angular relation to the grain other than 90 degrees resulting in a strong, relatively rigid, yet flexible, thin piece of wood which gives the appearance of being one edge of a brick.

4 Claims, 17 Drawing Figures

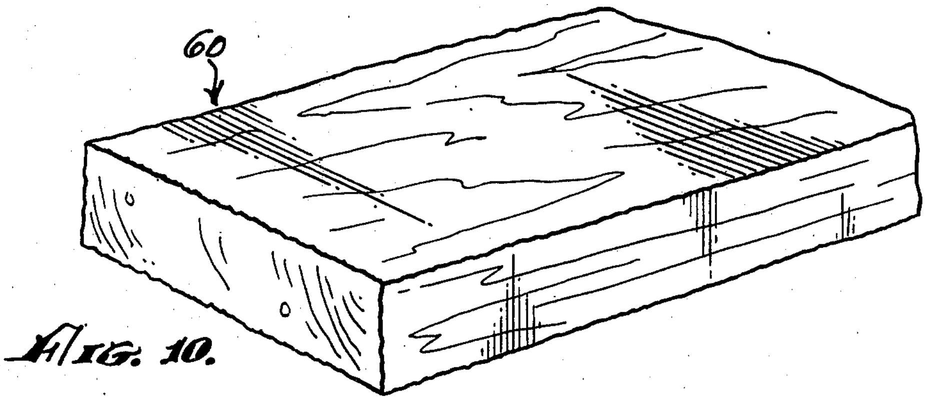
FIG. 10.
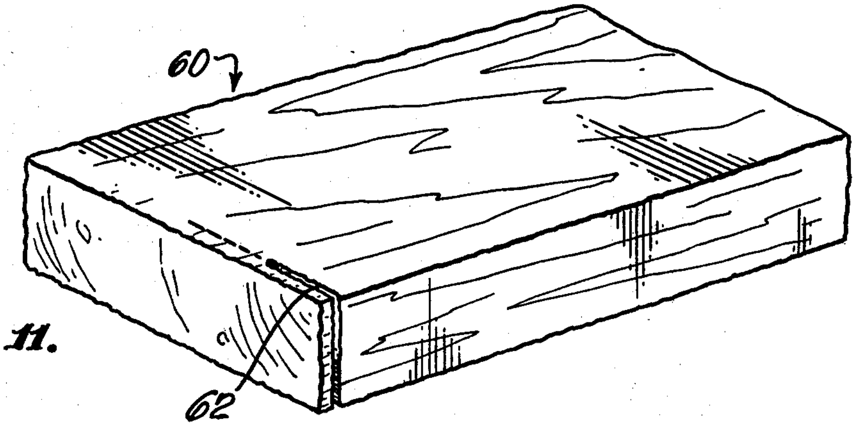
FIG. 11.
FIG. 12.
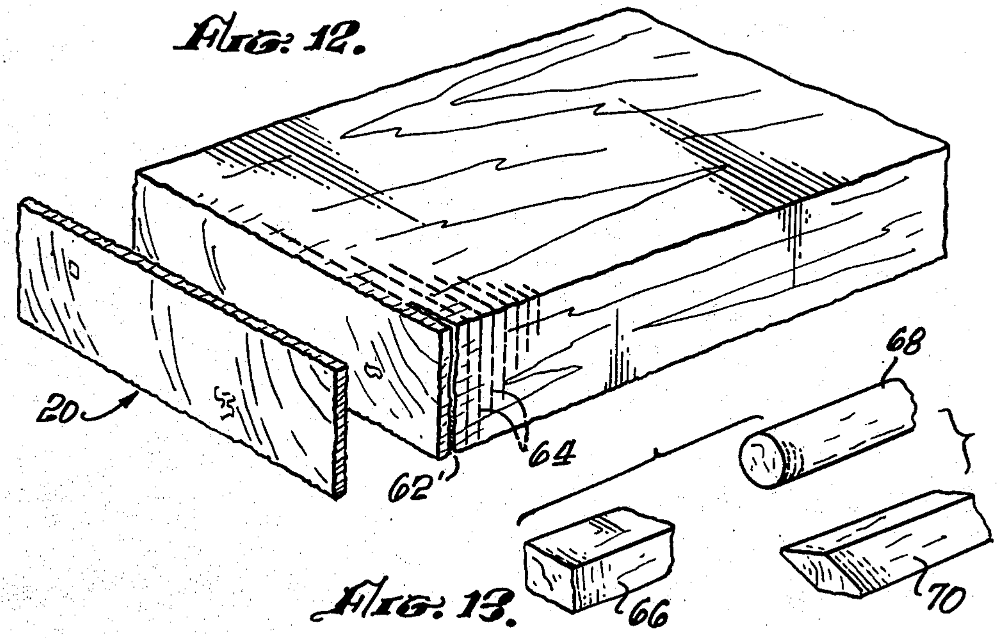
FIG. 13.

FIG. 14.
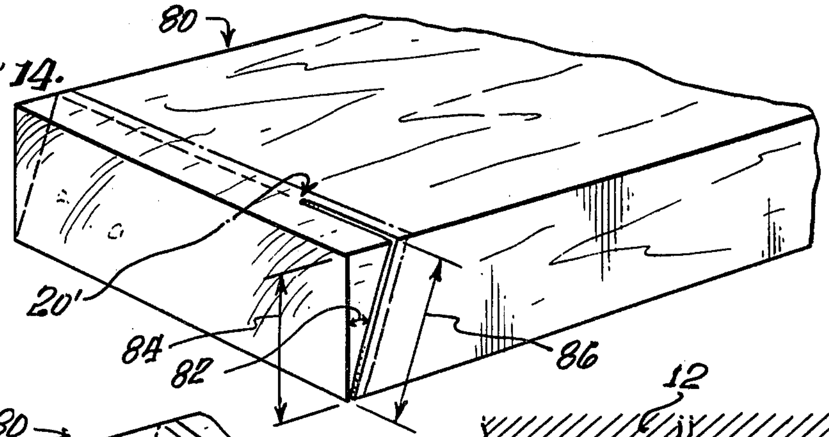
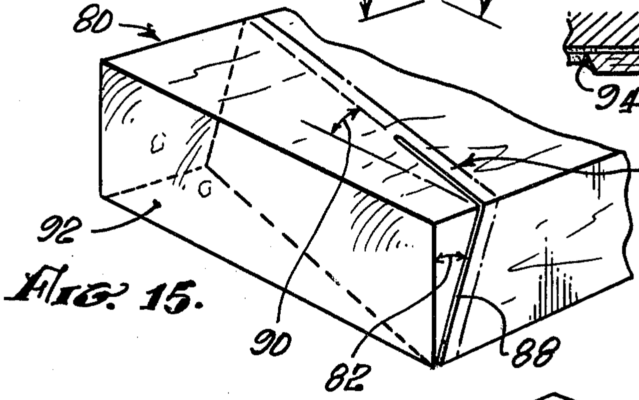
FIG. 15.
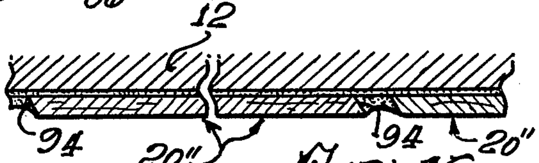
FIG. 16.
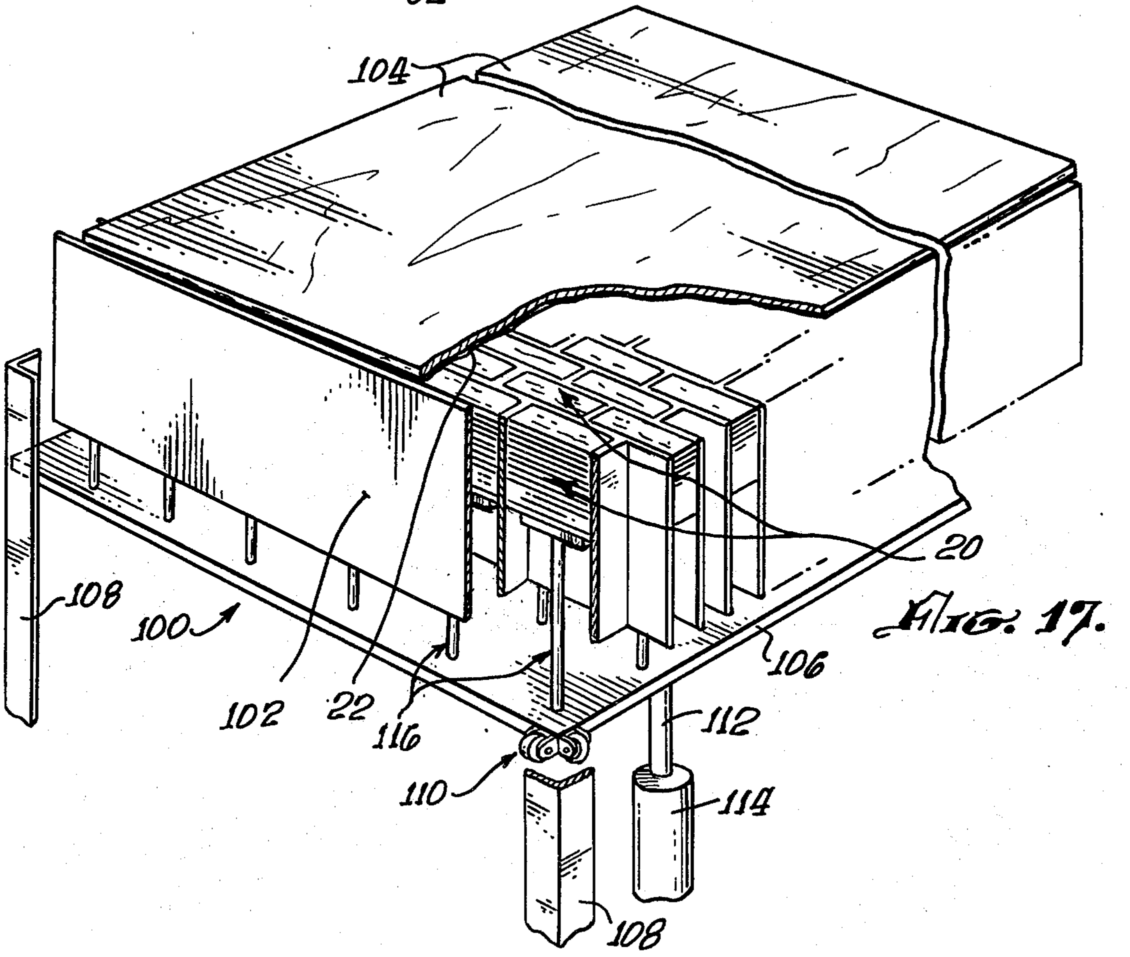
FIG. 17.

WOOD BRICK

CROSS-REFERENCE TO RELATED PATENT APPLICATIONS

There are no patent applications filed by me related to this application.

BACKGROUND OF THE INVENTION

1. FIELD OF THE INVENTION

This invention is in the general field of wall coverings and is more particularly in the field of wall coverings to provide a simulated brick appearance. The invention is even more particularly directed to a method and apparatus for providing a simulated brick appearance by the use of thin strips of wood appropriately spaced and applied to a backing material.

2. DESCRIPTION OF THE PRIOR ART

Many persons and firms have attempted to make simulated brick panels. There have even been numerous patents issued relating to the same. As examples, the following U.S. Patents show the wide interest in simulated brick siding or panels: U.S. Pat. Nos. 3,882,218; 3,621,625; 3,613,326; 3,496,694; 3,426,490; 3,304,673; 3,004,369; and 2,938,376.

All of the prior art has been directed to ceramic or plastic elements or the like, with an occasional reference to the use of cork. While it is recognized that cork might under some circumstances be considered a wood product, it has no relationship to the unique method of cross-cutting thin elements and the unique use of the elements so cross cut as further described in this application. Thus, there is no prior art anticipating or close to anticipating the present invention.

THE SUMMARY OF THE INVENTION

There is a widespread demand for wall coverings for buildings wherein a wood, masonry, gypsum, or other type wall construction can be covered so as to give the appearance of a brick construction. There have been many developments in this field including fiberglass reinforced plastic, cork, various masonry and painted surfaces, embossed surfaces, and the like. Some of these have achieved very realistic appearances, and some have not. Each, however, shares a common fault in being very expensive and in the case of the plastic materials utilizing materials coming into shorter and shorter supply.

I have studied the wall covering field extensively, and have been designing, conceiving and developing various attempts at alternatives for quite some time.

I have now developed a totally unique approach to the problem of simulated brick surfaces. I am using a material now which seems to most people to be a most unlikely material for simulating the appearance of brick and yet, most surprisingly, it does simulate very accurately the appearance of brick and at the same time provides advantages of economy, ease of handling, and durability beyond anything otherwise proposed for simulated brick surfaces.

What I am doing in my new method and the article resulting therefrom is to cut planks of wood across the grain of the wood in thin slices. This cutting is accomplished by me either at direct right angles to the grain or, preferrably, at various oblique angles, both as to the direction of the grain, and the plane of the plank. This latter is most desirable in many respects since it can provide from standard pieces of wood the appearance of facing edges having full dimensions of various sized bricks. Additionally, it seems to increase the strength and flexibility of the individual pieces.

When the wood has been cut into the desired strips, I then mount it by various means which will be described in more detail in the description of a preferred embodiment which comes later in this application into panel form and the like for ease of application to walls.

In the mounting of the individual simulated brick edges they are placed at a distance from one another and a material is placed between them which will simulate mortar. In the most economical form the sawdust created in cutting the individual strips is utilized by mixing with plaster or similar materials to form the material which simulates mortar and yet has a complete resiliency and durability not found by other materials. This material may be used so as to be flush with the individual simulated brick, or may even extend out, if desired, to indicate rough work, or my opinion the most preferable is that it is applied so as to be slightly below the simulated brick.

I have also developed mechanism for rapid automated production of panels utilizing this material all of which will be described in the description of a preferred embodiment which appears later in this application.

It is an object of this invention to provide simulated brick covering for walls and the like utilizing wood strips as the simulated brick.

Another object of this invention is to provide such simulated wood brick wall covering wherein the wood brick is formed of wood slices cut at an angular relationship to the direction of grain of the wood.

Another object of this invention is to utilize sawdust created in forming the simulated wood bricks as herein mentioned as a base material as a base material for simulated mortar between the simulated bricks.

The foregoing and other objects and advantages of this invention will become clear to those skilled in the art upon reading the description of a preferred embodiment which follows in conjunction with the appended drawings.

BRIEF DESCRIPTION OF THE DRAWINGS

FIG. 1 is a perspective view of a typical application of the invention as it is used in surfacing a wall, counter or bar, or the like;

FIG. 10 is a fragmentary perspective of a rough cut piece of lumber from which the wood brick shown in FIG. 5 is obtained;

FIG. 11 is a view similar to FIG. 10 indicating the start of a first saw sut to form the wood brick of the invention;

FIG. 12 is a view similar to FIG. 11 showing further sawing of the rough cut lumber;

FIG. 13 is a perspective view on a reduced scale showing other configurations of the wood brick units;

FIG. 14 is a fragmentary perspective view of a board or plank that is of a finish cut and showing the method of cutting such a board into a size more suitable to simulate a brick similar to that of FIG. 5;

FIG. 15 is a view similar to FIG. 14 in which a further modified cut to produce yet a slightly different wood brick than those shown in FIGS. 5 and 14;

FIG. 16 is an enlarged sectional view partly broken away of the wood brick of FIG. 15 adhered to a wall surface with the mortar applied there between; and FIG. 17 is a perspective view, with parts partly broken away, illustrating an apparatus which forms prefabricated wood brick panels utilizing the wood bricks of this invention.

DESCRIPTION OF A PREFERRED EMBODIMENT

Figure 1:
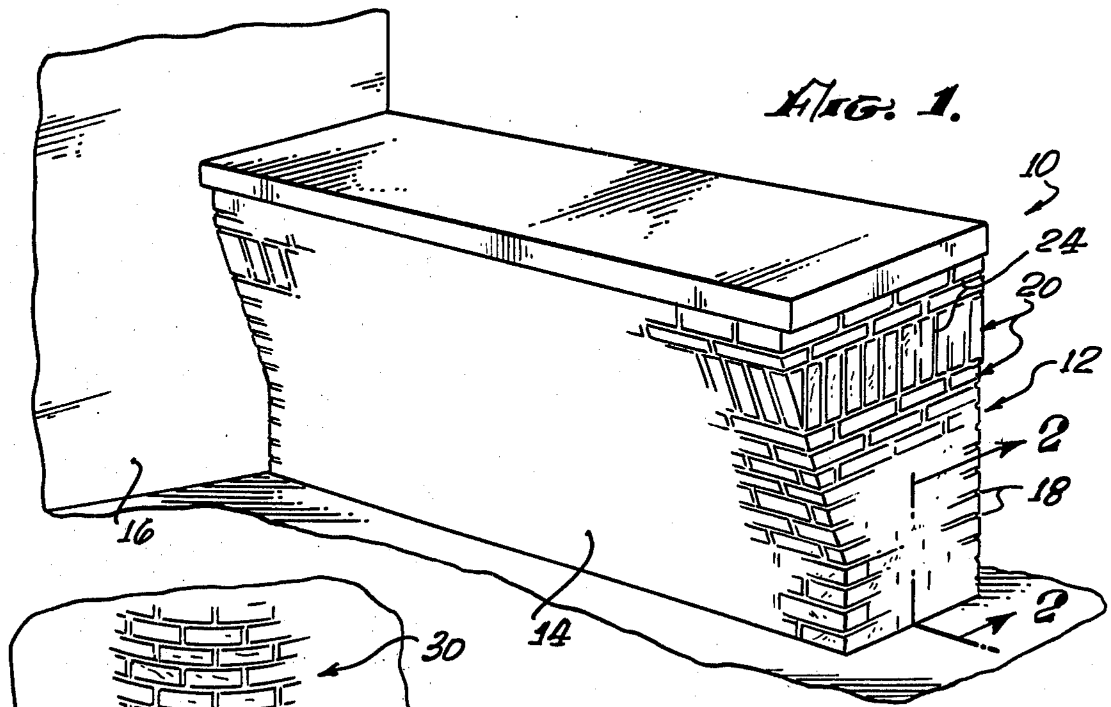

FIGS. 1 through 4 show certain elements of the use of the method and apparatus of this invention for covering surfaces whether flat or contoured with a material which simulates the appearance of brick. FIG. 1 illustrates a serving counter or the like 10 having a number of wood brick simulating elements 20 mounted upon the surfaces of the counter unit and the wall for example 12, 14, and 16. The spaces 18 between the bricks 20 are generally filled with some material 24 to simulate mortar. A most desirable material is a mixture of plaster or the like with sawdust as is further hereinafter mentioned. As shown in the cross-section FIG. 2, the wall surface 12 may be coated with a layer of adhesive or the like 22 onto which the individual wood brick units may be placed and to which they will adhere. Mortar or a simulation thereof 24 is normally inserted between the simulated bricks 20 after which the entire outside surface may be sprayed with a protective and enhancing material 26 such as polyester or the like.

Figure 3:
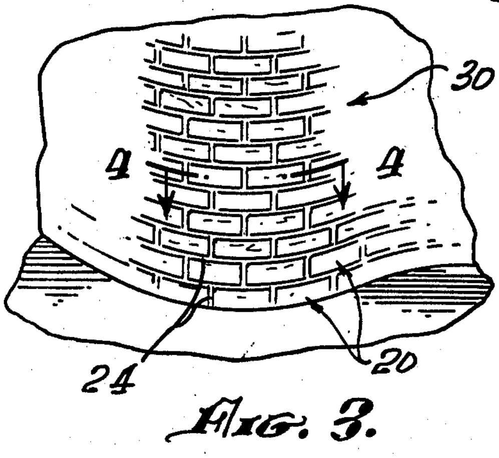
FIG. 3 is a view of a contoured surface onto which the invention may be mounted.
Figure 2:
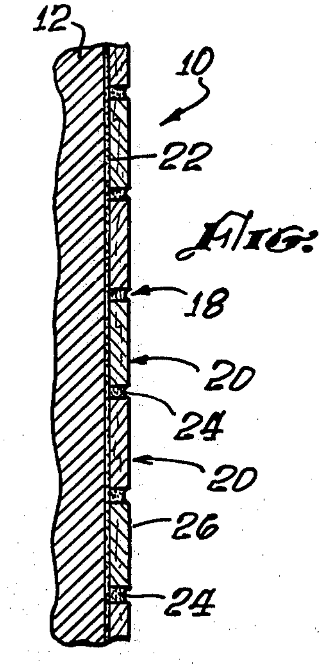
FIG. 2 is an enlarged fragmentary section taken on line 2—2 of FIG. 1.
Figure 4:
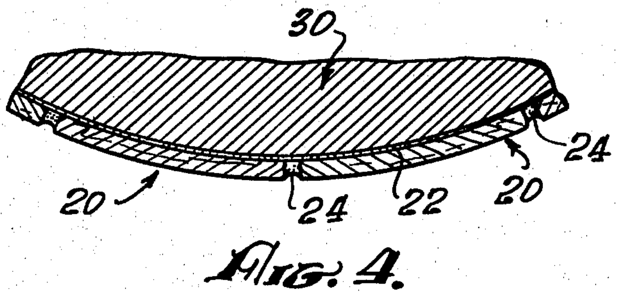
FIG. 4 is an enlarged fragmentary section taken on line 4—4 of FIG. 3.

As will be clear in FIGS. 3 and 4, a curved wall surface 30 may be treated with an adhesive 22 after which the simulating brick units 20 may be applied with the mortar or simulation thereof 24 between them. The brick simulating elements made of wood in this manner easily conform to the curvature of the wall 30 whereas other simulated brick materials do not so conform.

Figure 5:
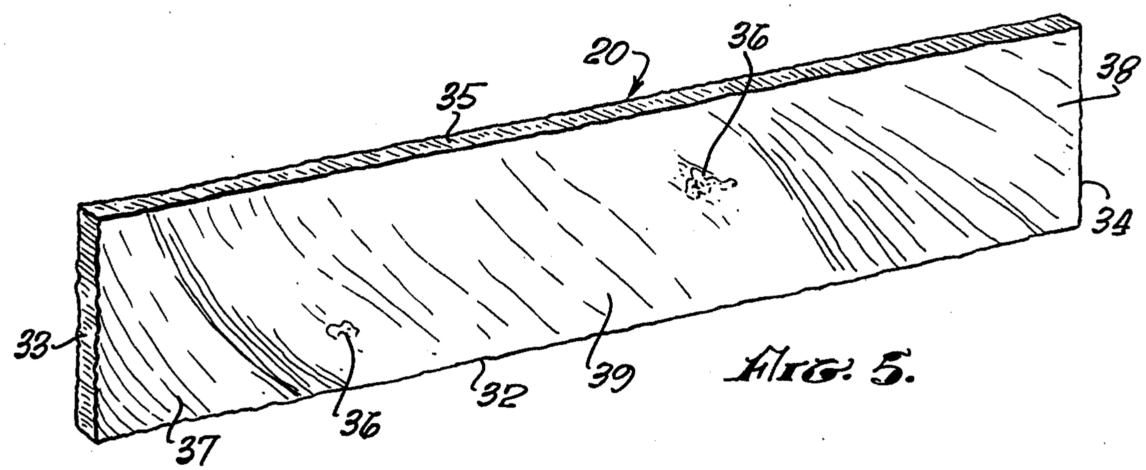
FIG. 5 is a perspective of one typical simulated brick of this invention.
Figure 6:
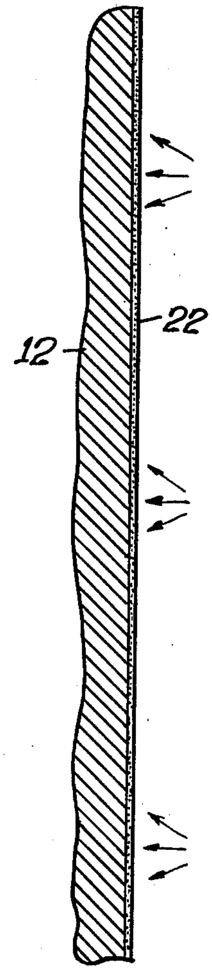
FIG. 6 is an enlarged fragmentary section of a surface to which the simulated brick of this invention may be applied, with a layer of bonding material on said surface.

FIG. 5 shows a typical wood tile of the type employed in the examples of FIGS. 1 through 4. As a rule, the tile is produced from conventional rough cuts of lumber. In the example, FIG. 5, the tile preferably would be approximately $7\frac{7}{8}$ inches in length, $1\frac{3}{4}$ inches in height and $\frac{1}{4}$ inch thickness.

The wood tile 20 preferably would retain roughened bottom edges 32, sides 33 and 34, and top edge 35. The irregularities produced by rough cut lumber allow the edges 32 to 35 to retain the grout 24 that eventually will fill the spaces between the wood brick units. Additionally, the rough edges have, from a casual observation, the appearance of a ceramic brick which normally does have rough edges.

I have found also that the normal knots 36, dark tree ring areas 37 and 38, and the lighter tree ring areas 39 leave the natural impression upon a casual observer of the irregularities normally found in a common ceramic brick surface. The cutting across the grain eliminates splintering which is common in thin wood strips and further causes a more brick-like appearance to the casual observer. Further, cutting across the grain makes the wood strip resulting quite flexible and pliable, particularly if moistened, in order to accommodate curved or unusual surfaces.

Figure 7:
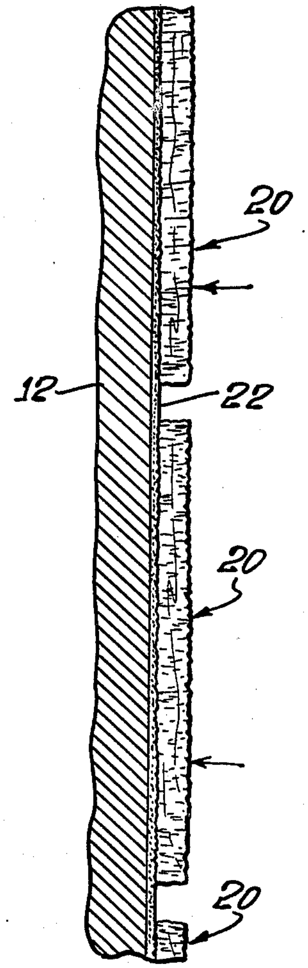
FIG. 7 is an enlarged section similar to FIG. 6 but showing the wood brick pressed onto the layer of bonding material.
Figure 8:
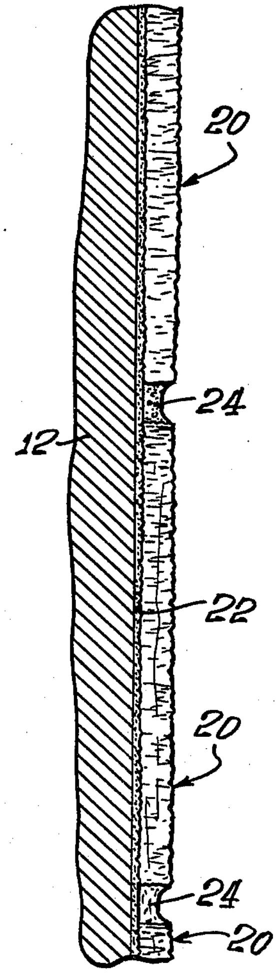
FIG. 8 is a view similar to FIG. 7 but with mortar having been placed into the spaces between the wood bricks.
Figure 9:
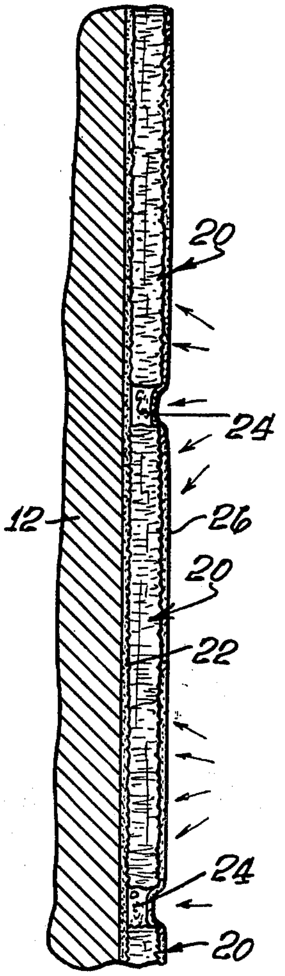
FIG. 9 is a view similar to FIG. 8 showing a protective coat having been applied over the face of the wood brick and mortar.

FIGS. 6 through 9 show successive steps taken to mount the wood brick simulating elements to a wall or panel surface. As seen in the enlarged cross section of FIG. 6, a wall or panel made of wood, concrete or other structural material is coated with a layer 22 of adhesive. This adhesive can be typically a currently marketed bonding material such as rubber cement, panel adhesive, or the like. FIG. 7 indicates the wood brick 20 being pressed onto the adhesive layer, and in FIG. 8 the mortar material 24 is placed into spaces between each wood brick unit. Many mortar materials can be mixed with sawdust in order to prevent flaking or cracking. FIG. 9 shows the final coating of a layer 26 of Polyester or a like substance in order to seal the wood brick simulating elements and grout or mortar from moisture and to enhance the wood grain appearance.

Although the wood brick unit FIG. 5 can be bent to conform to a curved surface such as the one shown in FIGS. 3 and 4 in its natural state, the bending action can be made easier by spraying with shellac, polyester, water or other material prior to adhering it to the adhesive 22. The wetting process allows the wood to bend to a considerably larger degree than existing simulated brick materials.

FIG. 10 illustrates a board or beam 60 which is the stock from which the wood simulating brick unit 20 of the invention may be fabricated. Preferably, this board will be a "rough cut" piece of lumber as is produced at lumber mills prior to being "finish cut" at later stages for many commercial uses requiring a smooth exterior surface. While a finish or "S-4-S" piece of lumber may be used, it is much preferable to use the rough cut lumber since it more closely approximates the appearance of a brick to the casual observer as has been heretofore set forth.

FIG. 11 shows the beginning cut 62 across the grain of the board 60. FIG. 12 shows one of the wood brick units 20 having been cut off from the beam 60 and another cut 62' being started for manufacture of a second wood brick unit. Dotted lines 64 indicate locations of further cuts along the beam that will produce a plurality of wood bricks from a single piece of lumber.

As I have indicated in the perspective of FIG. 13, any number of configurations of lumber shapes can be used such as wood squares 66, wood circles 68 or wood diamonds 70. These shapes can be applied to panels or walls in much the same manner as previously described in FIGS. 6 through 9.

I have found that with finish lumber it is preferable to cut the wood simulated brick elements as indicated in FIGS. 14 and 15 in preferance to a straight cut across the end. In this manner each element can be somewhat longer than the breadth of the board from which it is being cut and also can be made to be broader than the width of the board from which it is cut. Also, a somewhat uneven edge will thus be produced so as to more closely simulate the brick appearance. Naturally, this method of cutting is not limited to finish lumber and can be used with rough lumber as well.

The "finish cut" wood beam designated as 80 in FIG. 14 is shown being cut an an angle 82 from the vertical and will produce a height 86 to the wood brick of which is slightly higher than that of the actual height 84 of the original "finish cut" dimension.

Another adaptation of a different cut is employed to produce a larger surface area than that provided by an actual "finish cut" dimension of a beam is shown in FIG. 15. In this showing, the cut 88 being made is at an angle 82 from the vertical as was shown in FIG. 14, but also at an angle 90 away from the plane of the face 92 of the beam.

The variations of cuts 82 and 88 in FIGS. 14 and 15 produce larger wood bricks than the initial "finish cut" dimensions of the beam 80, and creates angular faces 94 on top and bottom of wood brick 20' as shown in FIG. 14 and top, bottom, and both sides of wood brick 20" as shown in FIG. 15.

FIG. 16 shows a further advantage of these angular cuts as mortar retention faces. As viewed in FIG. 16, the angular faces 94 help form an undercut that retains mortar 24 much more readily than straight cut edges.

FIG. 17 is an overall perspective view of a mechanism 100 which can place a large number of wood brick units onto a panel at one time. In this arrangement, wood simulated brick units 10, are stacked into a magazine receptacle 102 which is stationary and a panel 104 is placed atop the receptacle. The underside of the panel is coated with a bonding layer 22 such as described earlier in this application. A moveable plate 106 riding in vertical channels 108 with the aid of roller assemblies 110 is connected to a piston rod 112 of a cylinder 114. Hydraulically or pneumatically, the rod 112 is lifted upwardly until push rod assemblies 116 move the stacks of wood brick into contact with the adhesive 22. The plate 106 then is retracted and the panel 104 with its wood brick layer is removed. Another bonded panel 106 is then placed atop the magazine receptacle 102 and the procedure is repeated. I have found that panels 104 can then be utilized as structural sheets to be placed onto walls or other surfaces to simulate a brick-like appearance. The spaces between the wood brick are then filled with paint or grout to complete the structural sheet.

Throughout the foregoing description and this specification I have frequently used the term "wood brick" and alternately "wood simulated brick." It is to be understood that there is no actual brick as such being proposed in this application, but wherever those terms are used, it is meant to mean a thin "slice" of wood from an end cut as indicated and the purpose of which is to simulate the side or edge or end of other appropriate surface of a customary ceramic brick.

While the embodiments of this invention, particularly shown and described are fully capable of achieving the objects and advantages desired, it is to be understood that such embodiments have been shown for purposes of illustration only and not for purposes of limitation.

I claim:

1. The method for producing a simulated brick surface which includes: (1) cutting a thin slice of wood from a plank of lumber along a plane generally across the grain direction of said plank of lumber, said plane being at an angle different than a plane normal to two parallel surfaces of said plank; and resulting in surface irregularities on the bottom, top, and side edges of said thin slice of wood (2) applying an adhesive means to a surface being prepared for a simulated brick covering; (3) pressing a plurality of said thin slices of wood onto said adhesive means on said surface in such a pattern as to produce a laid brick surface having grout-receiving spaces there between; (4) filling said grout-receiving spaces with a grout means in such a manner that the grout means conforms to and is retained by the irregular edges formed on said slice of wood by said cut plane; and (5) applying a coating on the exposed surfaces of said slice of wood and said exposed grout means of a protective and color enhancing polyester coat.

2. The method of claim 1 wherein sawdust produced in making said slices of wood is collected and mixed with another material to be used as the grout means between the individual wood slices on the panel.

3. The method as set forth in claim 1 wherein said slice of wood is prepared from a "finish cut" plank of lumber.

4. The method as set forth in claim 1 wherein said slice of wood is moistened in a liquid means for allowing said slice of wood to be bent onto a curved surface prior to being pressed onto said adhesive means.

* * * * *